W. R. HOCK.
SAUSAGE-STUFFERS.

No. 195,605. Patented Sept. 25, 1877.

Attest:
E. E. Court
August Petersohn

Inventor:
William R. Hock
by Louis Bagger & Co.,
Attys.

UNITED STATES PATENT OFFICE.

WILLIAM R. HOCK, OF CATASAUQUA, PENNSYLVANIA.

IMPROVEMENT IN SAUSAGE-STUFFERS.

Specification forming part of Letters Patent No. 195,605, dated September 25, 1877; application filed August 21, 1877.

*To all whom it may concern:*

Be it known that I, WILLIAM R. HOCK, of Catasauqua, in the county of Lehigh and State of Pennsylvania, have invented certain new and useful Improvements in Machines for Stuffing Sausages; and I do hereby declare that the following is a full, clear, and exact description thereof, which will enable others skilled in the art to which it appertains to make and use the same, reference being had to the accompanying drawings, which form a part of this specification, and in which—

Figure 1:
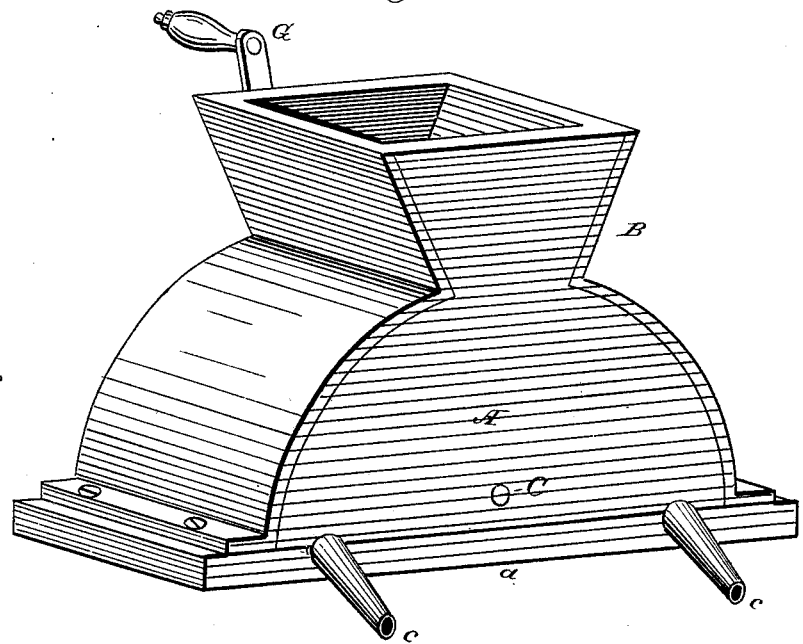
Figure 2:
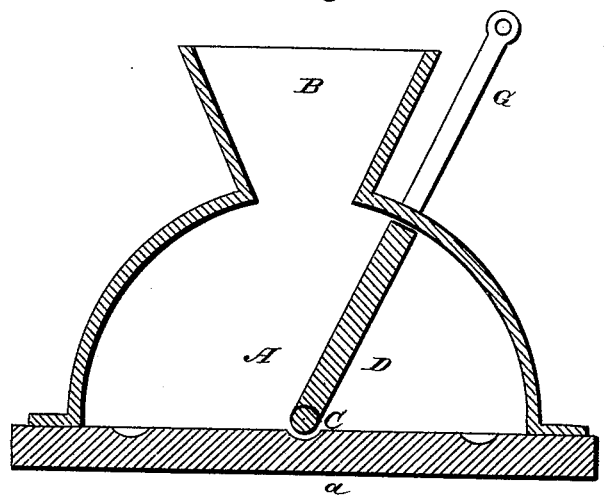

Figure 1 is a perspective view, and Fig. 2 is a longitudinal vertical section.

Similar letters of reference indicate corresponding parts in both the figures.

This invention relates to certain improvements in machines for stuffing sausages; and it consists in the construction and arrangement of parts hereinafter more fully shown and described.

In the drawing, A is a semi-cylindrical box, having a flat bottom, $a$. This box I prefer to make of cast-iron, its inside being polished off smoothly and evenly.

On top of box A is a hopper, B, through which the sausage-meat is fed into the box.

C is a shaft, journaled in the center of the sides of the box, close to the bottom of the same, and carrying a press-board, D, which fits closely against the ends and sides of the box.

To one end of shaft C, outside the box, is keyed a crank or handle, G, by which the press-board is operated.

In one side of the box, near the ends of the same, and as close by the bottom as practicable, are placed two spouts, $c\ c$, through which the sausage-meat is fed into the skins.

From the foregoing description the operation and advantages of my invention will be readily understood.

The box A and hopper B are filled with sausage-meat, and the skins are attached to the spouts $c$. By operating the crank G the press-board D is oscillated, thus forcing the contents of the box out through the spouts $c\ c$ alternately and into the skins, which, when stuffed, are removed and replaced by others. While the press-board D is forcing the contents of the box out through the spout $c$ in one end thereof, the contents of the hopper drop down into the other end of the box, where they are thus ready for the back movement of the press-board. The hopper may, in the meantime, be refilled without stopping the machine.

It is obvious that, if desirable, one of the spouts $c$ may be plugged up, and only the remaining one operated.

Having thus described my invention, I claim and desire to secure by Letters Patent of the United States—

The improved machine for stuffing sausages herein described, consisting of semi-cylindrical box A, having flat bottom $a$, hopper B, and spouts $c\ c$, oscillating press-board D, and crank or handle G, all combined and arranged to operate substantially in the manner and for the purpose herein shown and specified.

In testimony that I claim the foregoing as my own I have hereto affixed my signature in presence of two witnesses.

WILLIAM R. HOCK.

Witnesses:
R. CLAY HAMERSLY,
HARRISON HOWER.